United States Patent [19]

Krishnamurty et al.

[11] 4,442,463
[45] Apr. 10, 1984

[54] SAFEGUARDING OF DATA RECORDED ON DISK BY TUNNEL ERASE MAGNETIC HEAD ASSEMBLY

[75] Inventors: Rajan Krishnamurty, Austin; John A. Voltin, Round Rock, both of Tex.

[73] Assignee: International Business Machines Corporation, Armonk, N.Y.

[21] Appl. No.: 445,123

[22] Filed: Nov. 29, 1982

Related U.S. Application Data

[63] Continuation of Ser. No. 208,736, Nov. 20, 1980.

[51] Int. Cl.³ ........................ G11B 15/04; G11B 5/47
[52] U.S. Cl. ........................................ 360/60; 360/66
[58] Field of Search .................. 360/60, 65, 66, 67, 360/68

[56] References Cited

PUBLICATIONS

"Magnetic Tape Unit Failure Detection", W. Ashbee et al., IBM TDB, vol. 14, Nov. 7, 12/71.

Primary Examiner—Vincent P. Canney
Attorney, Agent, or Firm—J. B. Kraft

[57] ABSTRACT

Apparatus is provided for the safeguarding of data recorded on disk and diskettes by tunnel erase magnetic head assembly which comprise a read/write transducer for magnetically recording data along tracks on said disk and a pair of magnetic erase transducers adjacent to the read/write transducer for limiting the width of the recorded data. The apparatus for safeguarding the recorded data comprises apparatus for sensing the activation of the erase and/or read/write transducer and apparatus responsive to such sensed activation for determining if the activation is erroneous.

7 Claims, 2 Drawing Figures

SAFEGUARDING OF DATA RECORDED ON DISK BY TUNNEL ERASE MAGNETIC HEAD ASSEMBLY

This is a continuation of application Ser. No. 208,736 filed Nov. 20, 1980.

DESCRIPTION

BACKGROUND OF THE INVENTION

1. Field of the Invention

This invention relates to apparatus for magnetically recording data on disks including flexible disk assemblies generally known as diskettes. More particularly, this invention relates to such recording utilizing magnetic head assemblies having a tunnel erasing function through the expedient of erasing transducers positioned on the active face of the magnetic recording head on opposite sides of a central read/write transducer.

2. Description of Prior Art

Magnetic recording systems utilizing magnetic heads to record and reproduce information from serial storage magnetic media has been of increasing importance over the past 20 years. The criticality of improving the magnetic characteristics of such heads has become more pronounced since the magnetic recording technology is constantly attempting to improve the area density of information recorded and reproduced on such magnetic media. Accordingly, the industry is constantly attempting to improve track density, i.e., increasing the number of tracks per inch across the recording surface of the magnetic medium. For example, magnetic media recording systems have advanced from original magnetic tapes and cards wherein the information was magnetically recorded in rectilinear tracks at a density in the order of 25 tracks per inch to the present more advanced magnetic disks including flexible diskettes wherein information is recorded in curvilinear tracks in densities varying from 48 to 500 tracks per square inch.

The track density is dependent upon the width of a track of information and thus requires minimizing the effect of width of the transducing gap of a magnetic transducer. One method of reduction is to utilize a read/write transducer having a relatively large gap width and to provide erase means for erasing the edges of the written track immediately after it is written. This expedient is known as tunnel erase or trim erase. In this manner, a narrow track of information will be effectively written and additionally, a wider track may be read by the transducer during the read mode through the deactivation of the erase means.

The status of this tunnel erase magnetic recording technology is comprehensively set forth in U.S. Pat. Nos. 3,769,469, Garnier et al and 4,110,804, Castrodale et al, both assigned to the assignee of the present invention. The apparatus of these patents which is directed towards high density recording on magnetic disks including flexible diskettes comprises a magnetic head recording assembly under which the curvilinear tracks of said disks rotate. The assembly comprises a central read/write transducer which essentially is a magnetic core with a gap on the active face of the head assembly and with a read/write coil wound on the magnetic core; and a pair of additional transducers which are in effect magnetic cores on opposite sides of the central magnetic core forming a pair of erase gaps on the active face of the head assembly. These erase cores of course contain coils which may be a pair of coils, one for each core or a single coil connected across both erase cores.

With this greatly expanded storage capacity for magnetically recorded information in disks, problems have arisen with respect to the preservation or safeguarding of the stored information against destruction or loss due to unexpected or random conditions which may cause unplanned activation of the recording assembly. For example, simple diskette memories at the present time can contain in the order of one million bytes of data which is the equivalent of about 500 printed pages. Thus, loss through the random overwriting or erasure of data can be very substantial and damaging to the user. This is particularly the case when the erased or overwritten tracks are indexing tracks on the disk memory since without indexing tracks, access to other data on tracks which are not destroyed becomes impossible.

Accordingly, there is a need in the disk recording art for effective apparatus for safeguarding data on the disk from such random destruction. As will be hereinafter set forth, the present invention provides such an expedient which is both simple to implement and effective to use. The present invention involves the monitoring of current in both the read/write transducers and the associated tunnel erase transducers in order to determine whether there is any unwarranted random activation of such transducers.

U.S. Pat. No. 3,434,156 discloses an expedient of monitoring the current during an activated write operation on magnetic media involving magnetic transducer heads. However, the apparatus of this patent appears to be directed solely to the determination of whether the preselected write operation is functioning properly. The teaching of this patent does not deal with the problem of safeguarding against lost recorded information and therefore is not concerned with the monitoring or sensing of unwarranted activation of the write function let alone the unwarranted activation of a tunnel erase function. U.S. Pat. No. 4,149,241 is representative of a group of patents which teach current monitoring in general. In this particular application, a communications buss monitor is described. The patent does not deal with magnetic media recording or safeguarding against inadvertent write or erase operations.

SUMMARY OF THE PRESENT INVENTION

The present invention provides an effective low cost expedient for safeguarding data recorded on disks by magnetic recording head assemblies comprising read/write transducers and associated adjacent magnetic erase transducers for providing a tunnel erase function which limits the width of the recorded data. The safeguarding expedient comprises means for sensing the activation of the erase transducer and/or the activation of the write function of said read/write transducer, and means responsive to said activation for determining whether the activation is erroneous.

Please note that for convenience of definition in the claims we have used a generic term "disk" to include both the rigid magnetic recording disks as well as the flexible disks used in this technology and any other substantially circular magnetic recording media.

BRIEF DESCRIPTION OF THE DRAWINGS

Referring now to the drawings, wherein a preferred embodiment of the invention is illustrated, and wherein like reference numerals are used throughout to designate like parts.

DETAILED DESCRIPTION OF THE PREFERRED EMBODIMENT

The preferred embodiment to the present invention will be described with respect to circuit logic elements of FIG. 1 following the sequence of steps shown in FIG. 2. Since the present invention relates to an improvement in the tunnel erase or trim erase magnetic recording transducer head assembly of the type described in U.S. Pat. Nos. 3,769,469 and 4,110,804, the structure of the magnetic recording head assembly will only be described in the limited detail required for a complete understanding of the improvement of the present invention. For further details of the structure, its operation or supporting circuitry, as required, either of the above-mentioned patents may be referred to.

Figure 1:
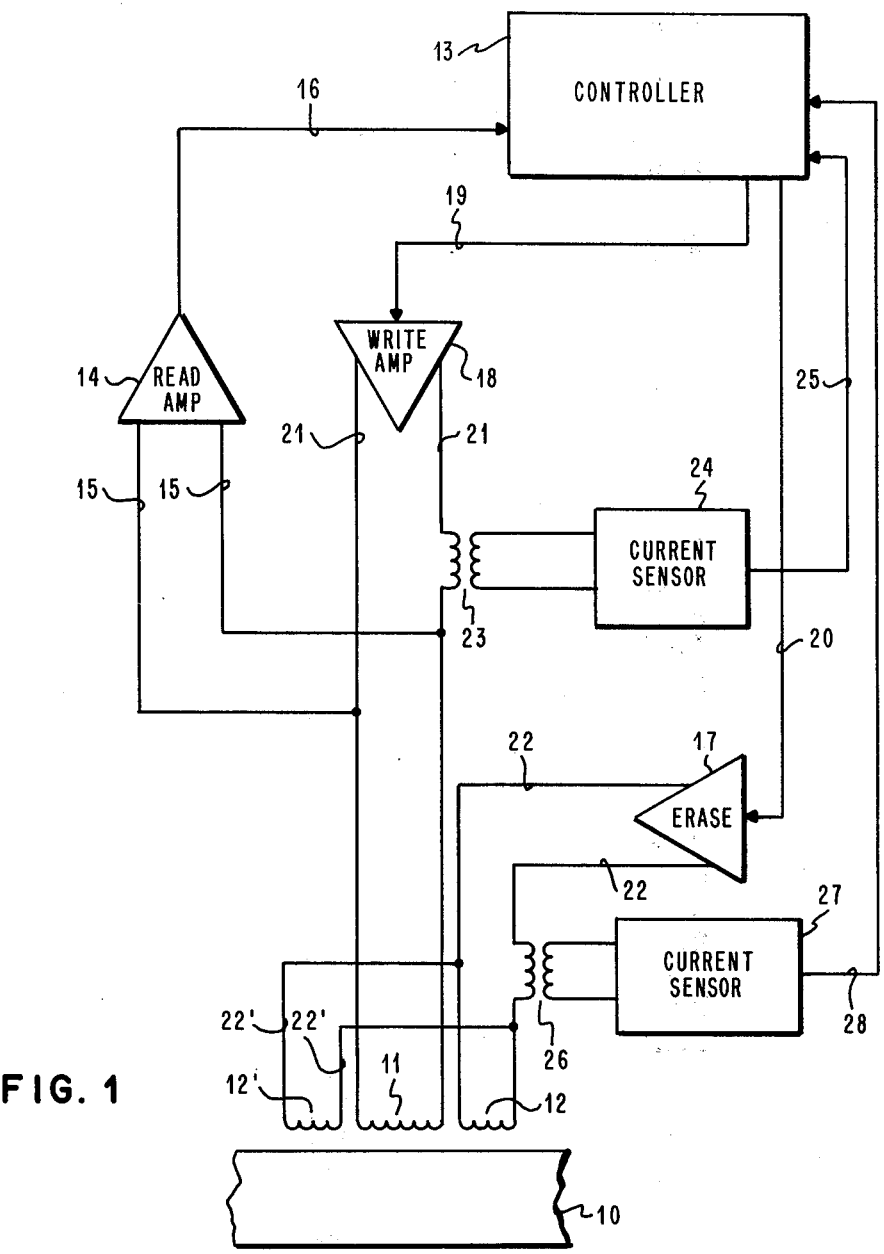
FIG. 1 is a diagrammatic circuit logic representation of the preferred embodiment of the present invention.
Figure 2:
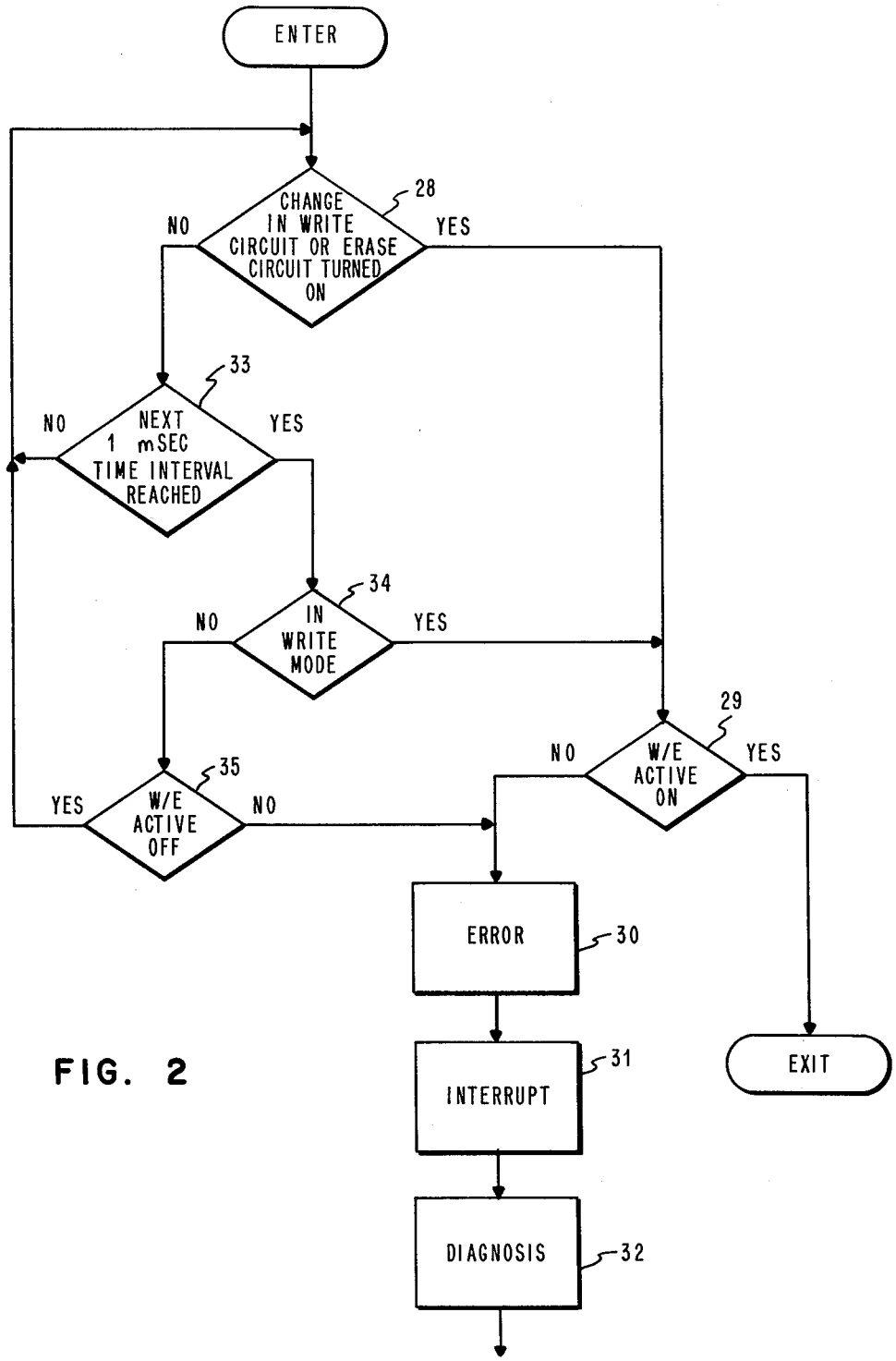
FIG. 2 is a flow chart of the sequence of steps involved in a sensing function of the present invention.

With reference to FIG. 1, substrate 10 represents a portion of a magnetic media disk or diskette upon which read/write coil 11 records and reads information in tracks in a conventional manner described in U.S. Pat. Nos. 3,769,469 and 4,110,804. Coil 11 is mounted on a conventional core (not shown). A pair of erase coils 12 and 12′ each having a standard core are situated adjacent to and on either side of read/write coil 11 and function in the manner described in the above-mentioned two patents to trim the track recorded through read/write coil 11 during a write operation. As described in the above patents, when coil 11 is activated during a write operation, coils 12 and 12′ are activated and produce a uniform flux so as to in effect neutralize any magnetism on either side of the written channel being produced by coil 11. Thus, the channels are trimmed in the conventional manner so that high density of channels may be recorded on the medium 10 without adjacent channels interfering with data being written on each other. Coil 11 together with its core form the read/write transducer and coils 12 and 12′ together with their cores form the trim erase or tunnel erase transducers.

The read/write and trim erse functions are carried out under the control of a conventional magnetic recording assembly controller 13. Under the control of controller 13, conventional read operations are carried out by the activation of read amplifier 14 which receives the input read by coil 11 through lines 15 and conveys this data to controller 13 via line 16. During this read operation, controller 13 does not activate erase amplifier 17. During a typical write function, write amplifier 18 is activated via line 19. Also controller 13 activates erase amplifier 17 via line 20. When the write amplifier 18 or erase amplifier 17 are activated, this is known as a Write/Erase Active function. When this occurs, data is recorded through write amplifier 18 and coil 11 on the substrate in the conventional manner, and the recorded data is trimmed by the activation of erase amplifier 17 and erase coils 12 and 12′ in the conventional manner as described in U.S. Pat. Nos. 3,769,469 or 4,110,804. The write amplifier 18 controls write coil 11 over lines 21, and erase amplifier 17 controls erase coils 12 and 12′, respectively over lines 22 and 22′. In accordance with the present invention, the current levels in line 21 from write amplifier 18 are sensed through current sensing transformer means 23 by current sensor means 24 and input to controller 13 along line 25. Also, current in line 22 from erase amplifier 17 is sensed through current sensing transformer 26 through current sensing means 27 and input to controller 13 via line 28.

With the apparatus shown in FIG. 1, the sensing function of the present invention will now be described with respect to the processing flow chart shown in FIG. 2. The procedure is carried on under the control of controller 13 which may be a general purpose microprocessor such as an 8048 Microprocessor manufactured by Intel Corp. The circuit of FIG. 1 is continuously monitored, (see block 28, FIG. 2) to determine whether the write circuit has been activated or deactivated, i.e., any change in write amplifier circuit 18 as monitored through sensing transformer 23 (FIG. 1) and current sensor 24. Also, whether the erase circuit 17 has been turned on its monitored through current sensing transformer 26 through current sensor 27. If either of these conditions occur, then block 29, the controller 13 determines whether or not Write/Erase Active is on, i.e., write amplifier circuit 18 and erase amplifier circuit 17 have already been turned on. If the Write/Erase Active is on, there is a valid write operation going on and the system proceeds through the next step as indicated by the Exit from the process.

On the other hand, if at the operational stage of block 29, the Write/Erase Active function is not on, this indicates an error, block 30. The controller interrupts the write operation, block 31 and proceeds to a diagnostic procedure, block 32, for the error condition. This immediate interrupt or turning off of the system prevents any random movement of the read/write coil 11 or erase coils 12 or 12′ to other track locations. In addition, an attempt is made to reduce the probability of a random turn-on of the write transducer or the erase transducer, thereby minimizing the likelihood of destroying any information recorded on medium 10.

It should be noted that while the currents have been described as being monitored through current sensing transformers 23 and 26 conventional electronic current sensing means may be used in place of transformers 23 and 26.

Returning now to block 28, if there has been no change in either the write and/or erase circuits as monitored, respectively through transformers 23 and 26 in FIG. 1, the system will in effect wait until the next millisecond time interval is reached since in the example shown the controller 13 samples the current sensor every millisecond; this is indicated by block 33 and the looping back to block 28 (FIG. 2) for a No decision in block 33. When the next sampling point (one per one millisecond) has been reached as indicated by a Yes decision from block 33, the system then determines whether it is in the "write" mode, block 34. If the decision is not in a "write" mode i.e., it is in a "read-seek" mode, then determination is made as to whether the Write/Erase Active is off, block 35. If the Write/Erase Active is not off during a non-write operation as indicated by a No decision from block 35, this indicates that an error condition exists, and the previously described error procedure commencing with block 30 is carried out.

If the Write/Erase Active is off, as indicated by a Yes decision from block 33, then the sensing of the write and erase circuits is continued commencing with decision block 28.

If at a given one millisecond time interval, the controller 13 determines that the recording system is operating in the write mode as indicated by a Yes decision from block 34, then the controller 13 determines whether or not the Write/Erase Active function is on, block 29. If the Write/Erase Active function is on as indicated by a Yes decision from block 29, the system is operating properly, and the operation continues. On the other hand, if the Write/Erase Active function is not on, this indicates an error function, and the previously described error interrupt and diagnostic procedure commencing with block 30 is carried on.

While the invention has been particularly shown and described with reference to a preferred embodiment, it will be understood by those skilled in the art that various other changes in form and detail may be made without departing from the spirit and scope of the invention.

What is claimed is:

1. In apparatus for recording data in tracks on magnetic storage disks including a tunnel erase magnetic head recording assembly movable along said tracks and comprising a magnetic read/write transducer for magnetically recording data along said tracks and at least one magnetic erase transducer adjacent to said write transducer for limiting the width of recorded data, means for safeguarding data recorded on said disks comprising:

means operative during quiescent conditions when said apparatus is not writing nor reading and during operating conditions when said apparatus is reading or writing for sensing the activation of said erase transducer, and means responsive to said sensed activation for determining if said activation is erroneous.

2. In apparatus for recording data in tracks on magnetic storage disks including a tunnel erase magnetic head recording assembly movable along said tracks and comprising a magnetic read/write transducer for magnetically recording data along said tracks and at least one magnetic erase transducer adjacent to said write transducer for limiting the width of recorded data, means for safeguarding data recorded on said disks comprising:

means operative during quiescent conditions when said apparatus is not writing nor reading and during operating conditions when said apparatus is reading or writing for sensing the activation of the write function of said read/write transducer, and means responsive to said sensed activation for determining if said activation is erroneous.

3. The apparatus of claim 2 wherein said means for safeguarding data further includes:

means for sensing the activation of said erase transducer, and means responsive to said sensed activation for determining if said activation is erroneous.

4. The apparatus of claim 1 wherein the means which sense for the activation of said erase transducers are continuous sensing means.

5. The apparatus of claim 2 wherein the means which sense for the activation of said write function of said read/write transducer are continuous sensing means.

6. The apparatus of claim 1 wherein said magnetic transducer recording assembly includes a pair of said erase transducers each respectively on either side of write transducer for limiting the width of each track of recorded data.

7. The apparatus of claim 3 wherein said magnetic transducer recording assembly includes a pair of said erase transducers each respectively on either side of write transducer for limiting the width of each track of recorded data.

* * * * *